(12) United States Patent
Hörberg et al.

(10) Patent No.: US 9,030,382 B2
(45) Date of Patent: May 12, 2015

(54) METHOD AND DEVICE FOR TARGET DESIGNATION

(75) Inventors: Ulf Hörberg, Askersund (SE); Peter Andersson, Linghem (SE)

(73) Assignee: BAE Systems Bofors AB, Karlskoga (SE)

( * ) Notice: Subject to any disclaimer, the term of this patent is extended or adjusted under 35 U.S.C. 154(b) by 114 days.

(21) Appl. No.: 13/640,855

(22) PCT Filed: Apr. 14, 2011

(86) PCT No.: PCT/SE2011/000069
§ 371 (c)(1),
(2), (4) Date: Feb. 22, 2013

(87) PCT Pub. No.: WO2011/129740
PCT Pub. Date: Oct. 20, 2011

(65) Prior Publication Data
US 2013/0141312 A1    Jun. 6, 2013

(30) Foreign Application Priority Data
Apr. 16, 2010    (SE) ...................................... 1000383

(51) Int. Cl.
*G09G 5/00*    (2006.01)
*G02B 27/01*    (2006.01)
(Continued)

(52) U.S. Cl.
CPC .............. *G02B 27/017* (2013.01); *G01S 19/18* (2013.01); *G01S 19/31* (2013.01); *G01S 19/51* (2013.01); *G02B 7/002* (2013.01); *G02B 27/0093* (2013.01); *G02B 2027/0187* (2013.01); *G02B 2027/014* (2013.01)

(58) Field of Classification Search
CPC ......................... G02B 27/017; G02B 27/0179
USPC .......... 345/7, 8; 359/630, 618, 709, 717, 646; 349/11
See application file for complete search history.

(56) References Cited

U.S. PATENT DOCUMENTS

| | | | |
|---|---|---|---|
| 7,649,700 B1 * | 1/2010 | Diemer | 359/811 |
| 2004/0119986 A1 * | 6/2004 | Benke et al. | 356/614 |
| 2006/0033661 A1 * | 2/2006 | Swope et al. | 342/427 |
| 2006/0284792 A1 * | 12/2006 | Foxlin | 345/8 |

(Continued)

FOREIGN PATENT DOCUMENTS

| | | |
|---|---|---|
| JP | 2001-074493 A | 3/2001 |
| JP | 2005-069759 A | 3/2005 |
| JP | 2007-315775 A | 12/2007 |

OTHER PUBLICATIONS

Supplemental European Search Report issued Aug. 15, 2013 in corresponding European Application No. 11769158.

*Primary Examiner* — Jennifer Nguyen
(74) *Attorney, Agent, or Firm* — Novak Druce Connolly Bove + Quigg LLP (57) ABSTRACT

The invention relates to a method and a presentation device for presenting information about the angle to a target to a wearer (2) by means of a display (1) worn by the wearer tracking movement of the wearer's head, the wearer's head movements being detected and the angle of the wearer's head relative to a target being indicated on the display. According to the invention, movements of the wearer's (2) head are detected independently of the target, the position of the wearer is determined locally, the position of the target is designated and the display is controlled on the basis of local information about the wearer's head movement, the wearer's position and the position designated as the target in order to indicate the angle of the wearer's head relative to the target.

27 Claims, 6 Drawing Sheets

(51) Int. Cl.
*G02B 7/00* (2006.01)
*G02B 27/00* (2006.01)
*G01S 19/18* (2010.01)
*G01S 19/31* (2010.01)
*G01S 19/51* (2010.01)

(56) References Cited

U.S. PATENT DOCUMENTS

2008/0013184 A1 1/2008 Swope
2009/0289957 A1 11/2009 Sroka et al.

* cited by examiner

Fig.8

METHOD AND DEVICE FOR TARGET DESIGNATION

CROSS REFERENCE TO RELATED APPLICATIONS

This application is a National Phase filing under 35 U.S.C. §371 of PCT/SE2011/000069 filed on Apr. 14, 2011; and this application claims priority to Application No. 1000383-8 filed in Sweden on Apr. 16, 2010 under 35 U.S.C. §119; the entire contents of all are hereby incorporated by reference.

TECHNICAL FIELD

The present invention relates to a method for presenting information about the angle to a target to a wearer by means of a display worn by the wearer tracking movement of the wearer's head, the wearer's head movements being detected and the angle of the wearer's head relative to a target being indicated on the display. The invention also relates to a presentation device for presenting information about the angle to a target to a wearer comprising a display worn by the wearer mounted in such a way as to track the wearer's head movements and a head tracker for detecting the wearer's head movements, which display indicates the angle of the wearer's head relative to the target and is controllable via a control unit.

BACKGROUND

Reference is made to U.S. Pat. No. 5,200,827 for examples of a previously disclosed display system worn by a wearer. The systems concerned are complex systems which often also restrict the wearer's ability to observe the terrain.

Another example of a previously disclosed display system worn by a wearer is disclosed in US2006/0033661 A1 and is envisaged essentially as a rescue system. For the purpose of determining the wearer's head movements, the system is dependent on an external radio source in collaboration with at least two antennae on the wearer's helmet. Information is presented to the wearer by means of a head-up display, which may contain light-emitting diodes.

The purpose of the present invention is to propose a method for the presentation of target designation information and a presentation device which do not exhibit the same complexity as U.S. Pat. No. 5,200,827, but present appropriate information in a simple and user-friendly way at the same time as the wearer is afforded a good view of the terrain. At the same time, the purpose of the invention is to propose a method and a device which exhibit better accuracy in the presentation of information than can be achieved by a system according to US2006/0033661 A1, and which are not dependent on external signals for determining the wearer's head movements, but permit autonomous local determination of the wearer's head movements.

SUMMARY OF THE INVENTION

The purpose of the invention is achieved by a method characterized in that movements of the wearer's head are detected independently of the target, in that the wearer's position is determined locally, in that the position of the target is designated, and in that the display is controlled on the basis of local information about movement of the wearer's head, the wearer's position and the position designated as the target in order to indicate the angle of the wearer's head relative to the target.

The purpose of the invention is also achieved by a presentation device characterized in that the head tracker that it comprises is independent of the target, in that the presentation device comprises a local device for indicating the wearer's position, a receiver for receiving designation of the position of the target and a processing unit for controlling the display via the control unit in order to indicate the angle of the wearer's head relative to the target based on information gathered from the head tracker, from the device for indicating the position of the wearer and from a receiver for receiving designation of the position of the target.

The invention enables the display to be arranged and controlled so that the wearer's view of the terrain is influenced insignificantly, at the same time as the extent of the deviation between the angle of the wearer's head and the designation of the target is displayed to the wearer in a simple and straightforward manner. This means that the wearer is also able to concentrate on other tasks at the same time.

The independence of the head tracker from the target dispenses with the need for a transmitter at the target, that is to say an active target, but the head movements of the wearer can be determined locally at the wearer without external intervention. Determination of the wearer's position likewise takes place locally, that is to say at the wearer. The designation provides the wearer with information about the position of the target, that is to say the coordinates for the target. The entire process is associated with a high degree of autonomy.

Through its simplicity and compactness, furthermore, the solution also permits a user to wear other equipment worn on the head, for example a gas mask.

It can be mentioned in this context that indication with the help of helmet-mounted flashing points of light is in itself previously disclosed in JP 2009042896. The points of light are used here to warn a motorcyclist of appearing objects which may constitute a risk to safety. Parameters such as the speed of the motorcycle, the distance and the speed to a potential danger are considered relative to a driving visual field.

According to one advantageous method, the angle of the wearer's head relative to a target can preferably be indicated by means of at least three separate points of light included on the display, arranged consecutively and capable of individual activation and control.

Alternatively, according to another advantageous method, the angle of the wearer's head relative to a target can be indicated on the display by means of symbols that are capable of activation and control.

In particular for target-related designation, it is proposed according to one advantageous method that a central point of light should be activated when the designation coincides with or almost coincides with the angle of the wearer's head and lies within a first interval, that an outer point of light located relative to the central point of light is activated when the angle of the wearer's head deviates to the left of the designation and lies outside the first interval, and that a corresponding outer point of light located relative to the central point of light is activated when the angle of the wearer's head deviates to the right of the designation and lies outside the first interval.

It is proposed in particular in respect of the method according to the previous paragraph that an outer point of light located on the right relative to the central point of light should be activated when the angle of the wearer's head deviates to the left of the designation and lies outside the first interval and a corresponding outer point of light located on the left relative to the central point of light should be activated when the angle of the wearer's head deviates to the right of the designation and lies outside the first interval.

According to yet another advantageous method, it is proposed that the central point of light should be activated to emit a constant, preferably green shining light and that the outer points of light should be activated with a constant shining light, preferably red, in the event of minor deviations outside the first interval and a flashing light, preferably red, in the event of major deviations outside the first interval. The proposed activation contributes to the wearer being presented with the information in a readily interpreted manner, so that the wearer is able to adjust the direction of his head rapidly and easily essentially in the direction of the target designation.

According to a further development of the method according to the previous paragraph, it is proposed that the central point of light should be activated within an interval of approximately ±5° for the deviation between the target designation and the angle of the head, that a first outer point of light should be activated with a constant shining light within an interval of approximately −15° to −5°, and that a flashing light within an interval of approximately −180° to −15° and a second outer point of light should be activated with a constant shining light within an interval of approximately +5° to +15° and with a flashing light within an interval of approximately +15° to +180°. All angles of the head through a full circle, i.e. 360°, can be covered by the method.

As an alternative to the activation of points of light, the angle of the wearer's head relative to a target can be indicated on the display by means of symbols that are capable of activation and control. It is recommended that the symbols should be positioned for this purpose within the same area on the display.

Most of the methods proposed above lend themselves particularly well to target-related designation where the principal purpose may be to make it easy for the wearer to have targets identified rapidly and easily and clearly visible in his field of vision. The designation can relate to other information, however, and according to one proposed method the designation is related to an area such as a surveillance area or the boundary area of a firing range. There may be a requirement, for example, to indicate the area in which a soldier has responsibility for observation or an area within which the soldier shall combat emerging threats. The designation can also be related to a navigation route that can be utilized to guide the user along a defined navigation route.

According to yet another further development of the method, it is proposed that the angle of the wearer's head relative to a designation should be indicated by means of points of light in two directions incorporated into the display worn by the wearer for the purpose of designation in the lateral sense and the vertical sense and in directions representing combinations of lateral and vertical directions. The introduction of a two-dimensional presentation enables the wearer to be given a more precise designation, for example in conjunction with target designation.

According to a proposed embodiment of the presentation device, it is suitable for the display to be arranged mounted on a helmet worn by the wearer. The helmet provides a stable structure on which to mount the at least three points of light included in the display.

It is proposed in particular that the display should comprise at least three separate individually activated points of light arranged consecutively in order to indicate the angle of the wearer's head relative to the target.

In a proposed suitable embodiment of the presentation device, the at least three points of light on the display are constituted by light-emitting diodes. Light-emitting diodes permit a wide choice of suitable colours and a suitably wide angle of radiation, regulation of brightness and have a comparatively low price.

The points of light are preferably mounted consecutively essentially in the horizontal sense.

According to a proposed embodiment of the presentation device with three points of light arranged consecutively, it is proposed that the middle point of light should be arranged to shine with a different colour, preferably green, from the colour, preferably red, with which the outer points of light are arranged to shine. This embodiment exhibits simplicity in the presentation, which means that a wearer can be trained rapidly in the effective management of head movements relative to target designation or some other current designation.

According to a proposed embodiment of the presentation device, a head tracker is advantageously arranged in conjunction with the wearer's head, preferably on a helmet worn by the wearer, in order to track the wearer's head movements. Through this embodiment, rotation of the wearer's head can be tracked directly and easily. It can be noted in this context that head trackers in themselves are already familiar; see, for example, GB 2 347 573 A. Inertia systems utilizing gyroscopes and accelerometers are discussed in the aforementioned document.

It is also proposed that the receiver for receiving designation of the position of the target should be so arranged as to communicate with a target acquisition device capable of being aimed at the target.

The control unit can include a microprocessor. For the purpose of regulating the brightness of the points of light, it is proposed that the control unit should regulate the brightness by pulse width modulation, PWM.

For the purpose of indicating the wearer's position, it is proposed according to one embodiment that the device for indicating the wearer's position should consist of a so-called GPS (global positioning system).

As a target acquisition device, it is proposed that the aforementioned device should consist of a laser rangefinder and an electronic compass.

In order to provide the wearer with a more precise designation, it is proposed that the display of the presentation device should comprise points of light in two perpendicular directions, whereby at least three points of light are included in each direction. By this means, for example, a target can be designated both in the horizontal sense and in the vertical sense. Moreover, by combining the activation of vertical points of light with horizontal points of light, designation can be provided in directions which do not coincide with the two perpendicular directions of the points of light.

It is also proposed according to a suitable embodiment of the presentation device that the number of points of light arranged consecutively on the display should be uneven in number. This means that the points of light can be arranged symmetrically about a central point of light.

Finally, it is proposed as an alternative that the processing unit and the control unit based on gathered information should be so arranged as to indicate the angle of the wearer's head relative to a target on the display by means of symbols such as arrows.

BRIEF DESCRIPTION OF THE DRAWINGS

The invention is described below in more detail by means of illustrative embodiments with reference to the accompanying drawing, in which.

DETAILED DESCRIPTION OF THE PREFERRED EMBODIMENT

Figure 1:
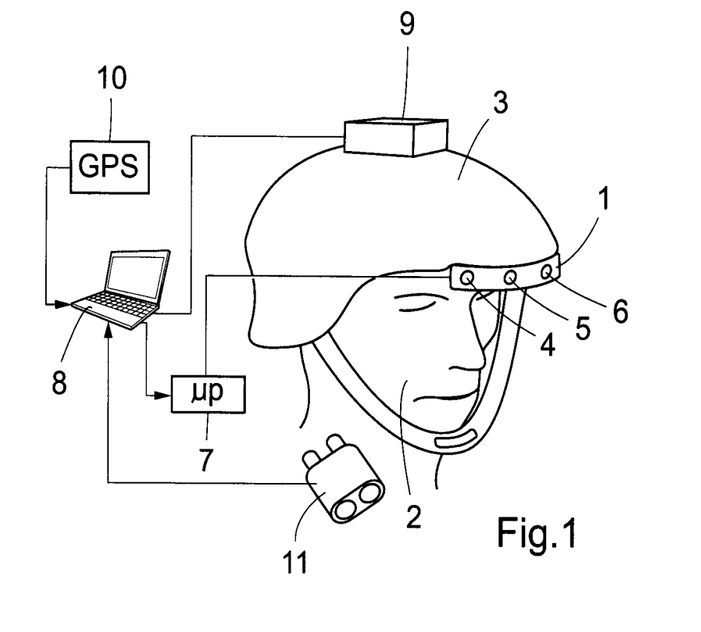
FIG. 1 depicts a first example of a presentation device according to the invention with a helmet-mounted display.

In the example of a presentation device illustrated in FIG. 1, a display 1 is mounted on a helmet 3 worn by a wearer 2. The display comprises light-emitting diodes which are preferably mounted adjacent to the edge of the helmet and, if desired, slightly below the edge 3.1 of the helmet with mutual spacing that may be in the order of 2.5 centimeters. The illustrated display comprises three light-emitting diodes (LEDs) 4, 5, 6, which form three separate points of light. The outer light-emitting diodes 4 and 6 are designed to emit light within a common colour spectrum, preferably red, while the light-emitting diode 5 in the middle is designed to emit light within a different colour spectrum, preferably green. The strength of the light-emitting diodes is dimensioned so that the brightness of the light-emitting diodes makes them visible out of doors in daylight, at the same time as the brightness can be adjusted to a low value for night time use; see the proposed method indicated below. There may also be a preference for light-emitting diodes with a wide angle of radiation. By selecting light-emitting diodes with a wide angle of radiation, the adjustment of the light-emitting diodes relative to the wearer's eyes is not so critical. Reference is made to the description below with reference to FIG. 2 for details of the positioning of the light-emitting diodes.

An embodiment with three separate points of light is illustrated and described in FIG. 1. In a more complex embodiment, the presentation device can comprise five points of light arranged consecutively, which, like the embodiment with three points of light or some other uneven number of points of light, offers symmetry with regard to the centremost point of light.

Activation of the light-emitting diodes is controlled via a control unit 7 connected to a computer 8. The control unit can comprise a microprocessor, preferably of the PIC type, to drive the light-emitting diodes, and the brightness of the light-emitting diodes in this case is suitably regulated by pulse width modulation, PWM. Such a microprocessor of the PIC type can drive the light-emitting diodes directly at the ports/inputs and no extra hardware is required for this reason. The computer 8 gathers information in respect of the turning movements by the wearer and the compass direction from a head tracker 9 with movement sensors and an electronic compass mounted on the wearer's helmet 3. A position-indicating device in the form of a GPS 10 provides the computer with information about the wearer's position and a target acquisition device 11 comprising a laser rangefinder and an electronic compass informs the computer 8 of the target position so that the computer is able, when instructed to designate, to provide details of the distance to the target and the direction in which the target can be found. Based on the information available in this way in the computer 8, the wearer can be kept informed of the angle of his head relative to the direction of a target angle by appropriate activation of the light-emitting diodes on the display via the control unit. The computer can suitably include a screen with a map which shows the position of the wearer, the designated target and the direction of the wearer's head. Control of the activation of the light-emitting diodes is described in more detail below with reference to FIG. 3. With reference to FIG. 4, a more detailed description is given below of how a soldier wearing a display is able to communicate with others in a group in order to receive target designation.

One or other of the products available on the market can be used as the head tracker 9. Accelerometers, a gyroscope and a compass can be included in such a product in order to give angles in the X, Y and Z axes.

Figure 2:
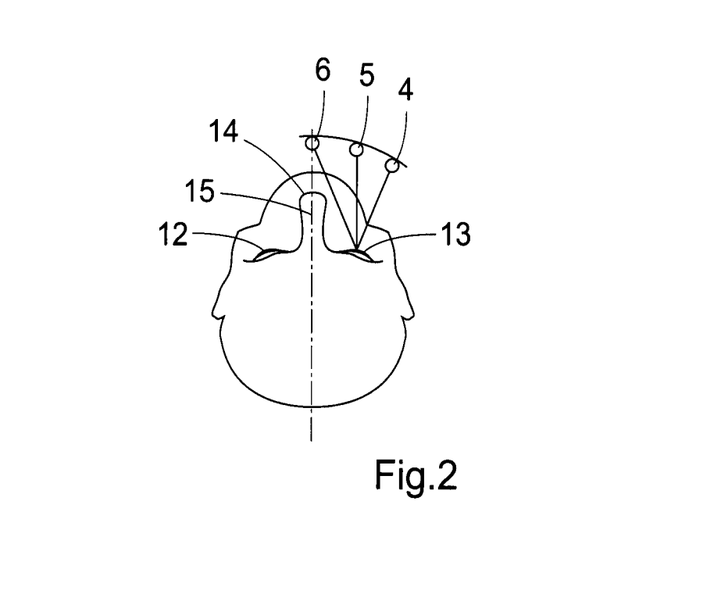
FIG. 2 depicts as a top view the positioning of the points of light of the display in the form of light-emitting diodes relative to the wearer's eyes.

FIG. 2 illustrates how the light-emitting diodes 4, 5, 6 can be positioned in front of the wearer's eyes 12, 13. The light-emitting diodes in this case are positioned in front of the wearer's right eye 13 to the right of a vertical plane 15 through the wearer's nose 14 and are positioned and oriented in such a way that the wearer's left eye 12 is screened. Positioning of the light-emitting diodes is effected so that the light-emitting diode 5 in the middle with a green light gives the impression of pointing directly ahead. The light-emitting diode 5 in this case is situated slightly inside the middle of the eye 13 towards the nose 14. The light-emitting diodes 4, 5, 6 can be angled slightly inwards towards the eye and downwards so that they point as effectively as possible towards the eye.

Figure 3:
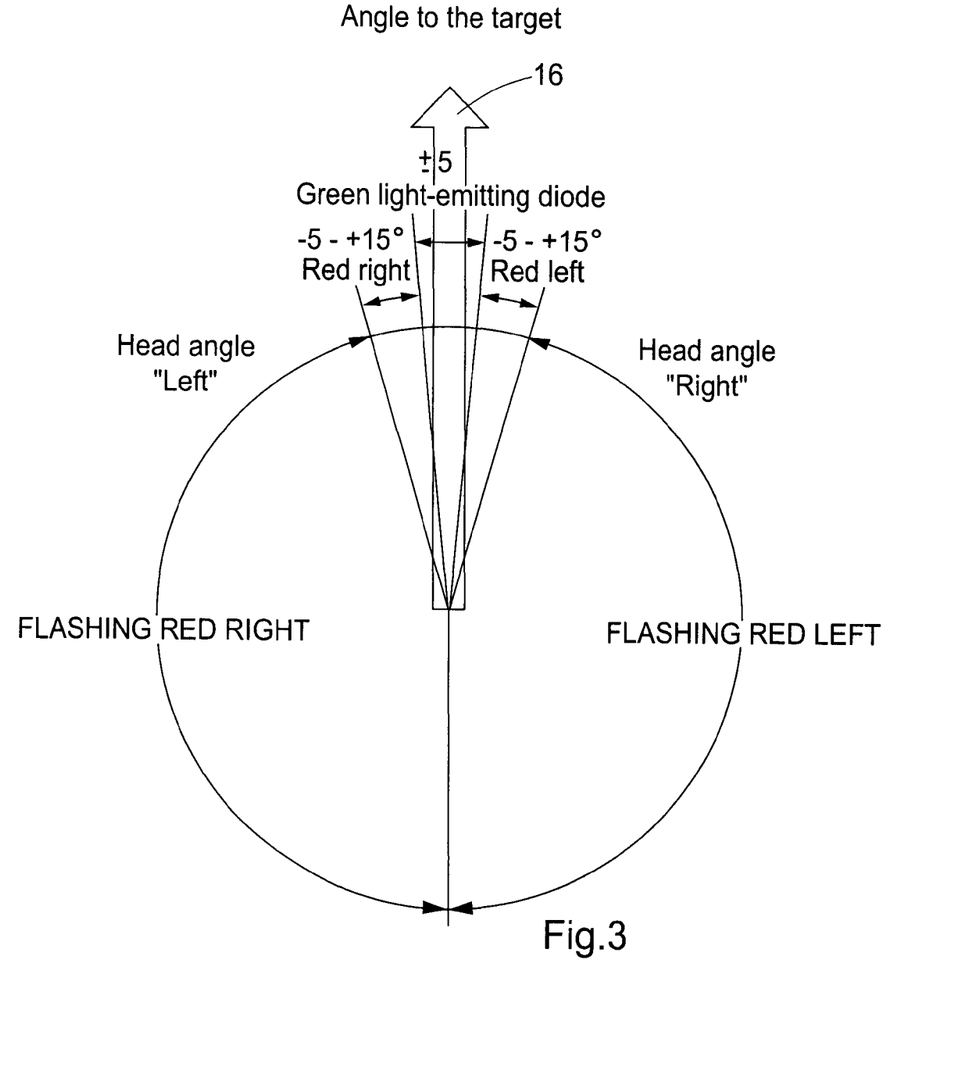
FIG. 3 depicts an example of how the activation of the points of light on the display can be controlled depending on the angle of a wearer's head relative to the direction of an actual target.
Figure 4:
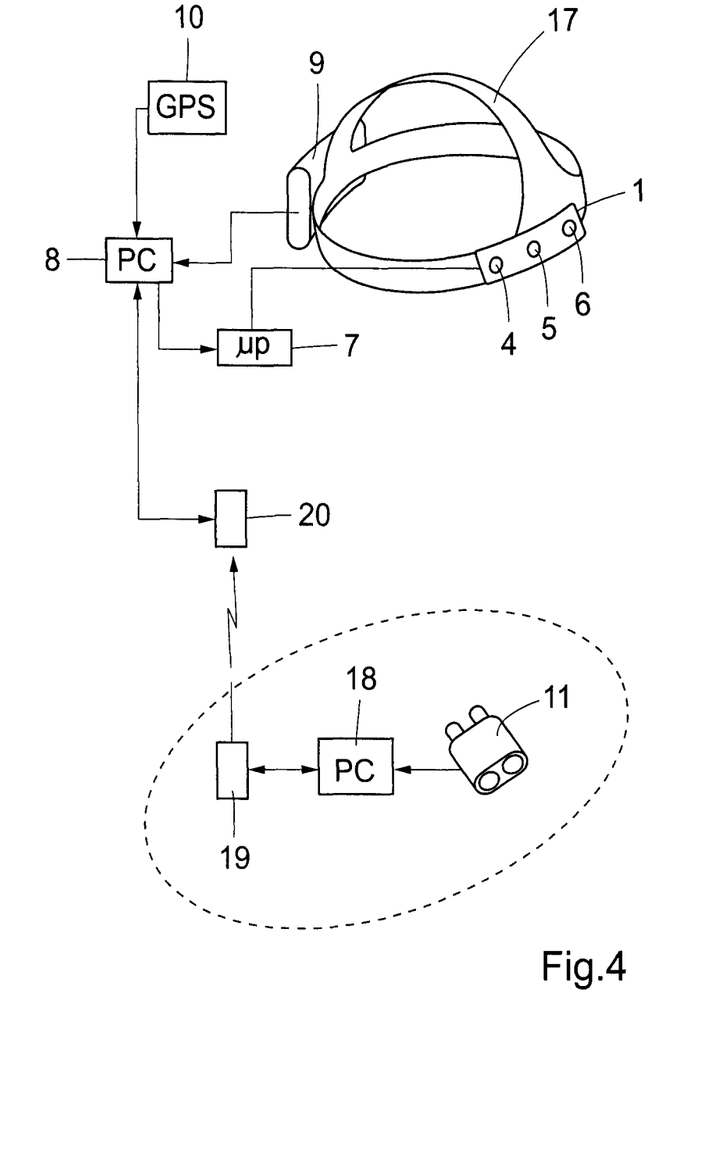
FIG. 4 depicts a second example of a presentation device according to the invention with a display mounted on a head harness.

FIG. 3 illustrates a proposed example of how constituent light-emitting diodes can be activated in order to inform the wearer of the display with light-emitting diodes. An arrow 16 indicates the actual angle of the target. If the angle of the wearer's head lies within an angular range of ±5° relative to the target angle 16, the light-emitting diode 5 in the middle is activated by emitting preferably a green light. Alternatively, the angular range can be subdivided into a central section of, let us say, ±2° emitting a constant green light and adjacent angular areas from, let us say, −5° to −2° and +2° to +5° respectively showing a flashing green light. If the angle of the wearer's head lies within an interval of −15° to −5° relative to the target angle 16, the outer right light-emitting diode 4 is activated by emitting a constant red shining light. In a corresponding manner, the left outer light-emitting diode 6 is activated if the angle of the wearer's head lies within an interval of +5° to +15° relative to the target angle 16 and emits a constant red shining light. If the angle of the wearer's head lies within an interval from −180° to −15° relative to the target angle 16, the outer right light-emitting diode 4 is activated and emits a flashing red light. In a corresponding manner, the left outer light-emitting diode 6 is activated if the angle of the wearer's head lies within an interval from +15° to +180° relative to the target angle and emits a flashing red light.

Illustrated in FIG. 4 is an alternative embodiment of a presentation device comprising a head harness 17 with a display 1 worn by a wearer. In the description of this embodiment, those components with a direct correspondence to components described with reference to FIG. 1 have been given the same reference designations. The display 1 is also shown here to comprise three light-emitting diodes 4, 5, 6 forming three separate points of light and is attached to the head harness 17 so that the light-emitting diodes are positioned as previously described with reference to FIG. 2. Activation of the light-emitting diodes is controlled according to principles similar to those described with reference to FIG. 1 via a control unit connected to a computer 8. The computer 8 gathers information in respect of the turning movements by the wearer and the compass direction from a head tracker 9 with movement sensors and an electronic compass mounted on the head harness 17. A position-indicating device in the form of a GPS 10 provides the computer with information about the wearer's position, and a target acquisition device 11 comprising a laser rangefinder and an electronic compass informs the computer of the position of the target. The laser rangefinder is shown here being operated by another person, for example a soldier/platoon commander, who, via his computer 18 and a radio link 19, 20, transmits information about the position of the target x, y, z and a command to designate this to the wearer's computer 8. Based on the information that has now been made available in the computer 8, the computer 8 calculates a compass course from its own position to the indicated target. This compass course together with a "designate" command are sent to the control unit 7, which can be constituted by a μ processor arranged adjacent to the wearer. The control unit 7 controls the wearer's display 1 so that the wearer is kept informed of the angle of his head relative to the direction of a target angle by appropriate activation of the light-emitting diodes of the display via the aforementioned control unit. The wearer of the wearer-worn display, for example an individual soldier, is relieved of the target acquisition procedure through this arrangement and can concentrate on his primary task. The designation of the target is provided wirelessly, for example, by the soldier's platoon commander.

An example of how a normal sequence for target designation can proceed is described below.

1. A soldier acquires a target with Vector binoculars 11. The Vector binoculars indicate the distance to the target with the help of an integral laser rangefinder and a compass angle with the help of an integral compass. The soldier's computer 18 obtains information about the soldier's own position via a GPS (not illustrated here) preferably in three perpendicular coordinate directions and is able, based on the available information, to calculate coordinates for the target and to position the target on the map.
2. Once the soldier considers that the target is correctly positioned on the map, he can choose to distribute the position of the target to all the other members of a network.
3. The target is then recorded in the computers of all the soldiers who are connected to the network and is presented on the soldiers' displays in the form of a map.
4. The platoon commander marks a soldier and a target and sends the "designate" command.
5. The designated soldier has information about his own position and the position of the target on his computer 8 in the form of coordinates. When the soldier receives the "designate" command, the soldier's computer 8 will give the control unit 7 on the soldier's helmet/head harness the order to designate in the actual compass direction by appropriate activation of the light-emitting diodes 4, 5 and 6 included in the wearer's display 1.

An embodiment with a head harness is described in the description of FIG. 4 above. The design of such a harness can be varied within a broad framework. The harness can also be envisaged as being replaced by other constructions intended for attachment to the head in the form of, for example, hearing protectors, a radio headset, a headband or similar.

Figure 5:
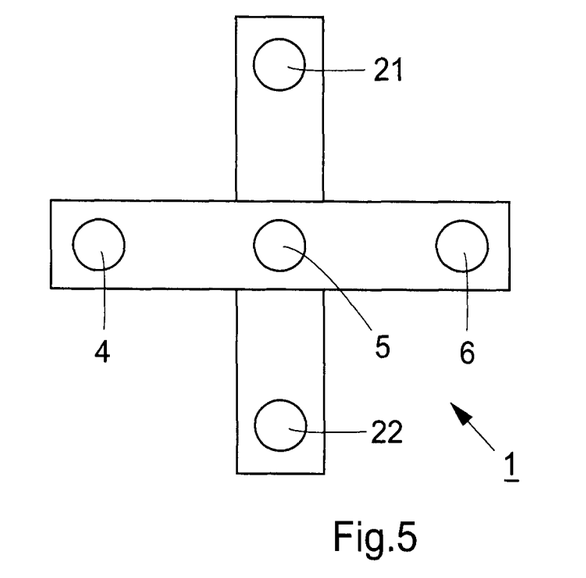
FIG. 5 depicts a simple example of a display included in a presentation device according to the invention for designation in both the horizontal sense and the vertical sense.

The display 1 illustrated in FIG. 5 comprises points of light 4, 5, 6 in the horizontal sense and points of light 21, 5, 22 in the vertical sense. The incorporation of such a display into the presentation device results in a presentation device which can provide two-dimensional designation, that is to say designation in the vertical sense, the horizontal sense and in other directions which lie in a plane through a horizontal and vertical axis. This enables a wearer of the presentation system to be provided with target designation inclined upwards to the right or to the left, for example. The same principles for the activation of the points of light as those described above can be applied, in principle, for the one-dimensional case with points of light arranged consecutively.

The two embodiments of the presentation device described with reference to FIG. 1 and FIG. 4 are both intended for target designation. Designation of other information can take place, however. For example, the presentation device can indicate the surveillance and/or combat sector for a soldier. In this case, the presentation can be made so that the point of light at the centre shines with a green light within the entire surveillance or combat sector, and so that the points of light which surround the point of light at the centre shine with a red light when the direction of the wearer's/soldier's head lies outside the boundary to the right and to the left respectively.

Figure 6:
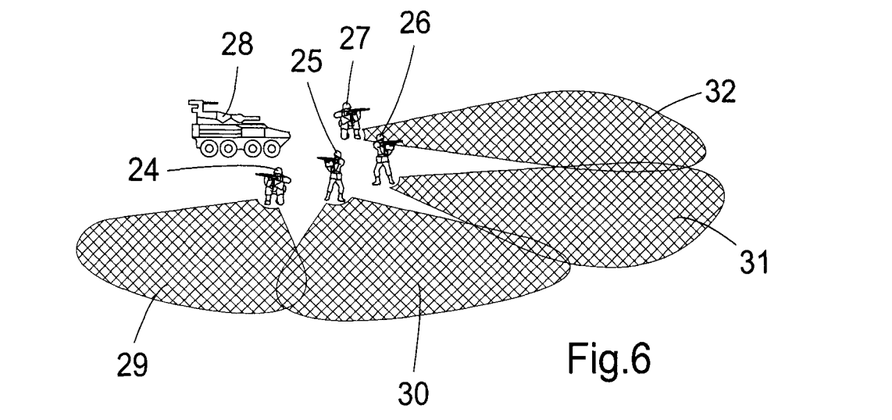
FIG. 6 depicts schematically an example of how observation areas can be allocated to soldiers in a group presented by displays tracking the soldiers' head movement.

Illustrated in FIG. 6 is an example of how soldiers 24-27 are assigned combat zones 29-32 via a fighting vehicle 28 and how these zones are individually marked on the respective soldier's head-worn display. The illustrated assignment of combat zones 29-32 provides good coverage without major overlapping.

Another possibility for designation is to allow the presentation device to present navigation information. For example, a soldier can be made to follow a line drawn on a map by causing the points of light to indicate the correct direction. For example, a green shining point of light can indicate the direction, while red shining points of light can indicate that the soldier is looking in a direction that deviates from the correct course.

Figure 7:
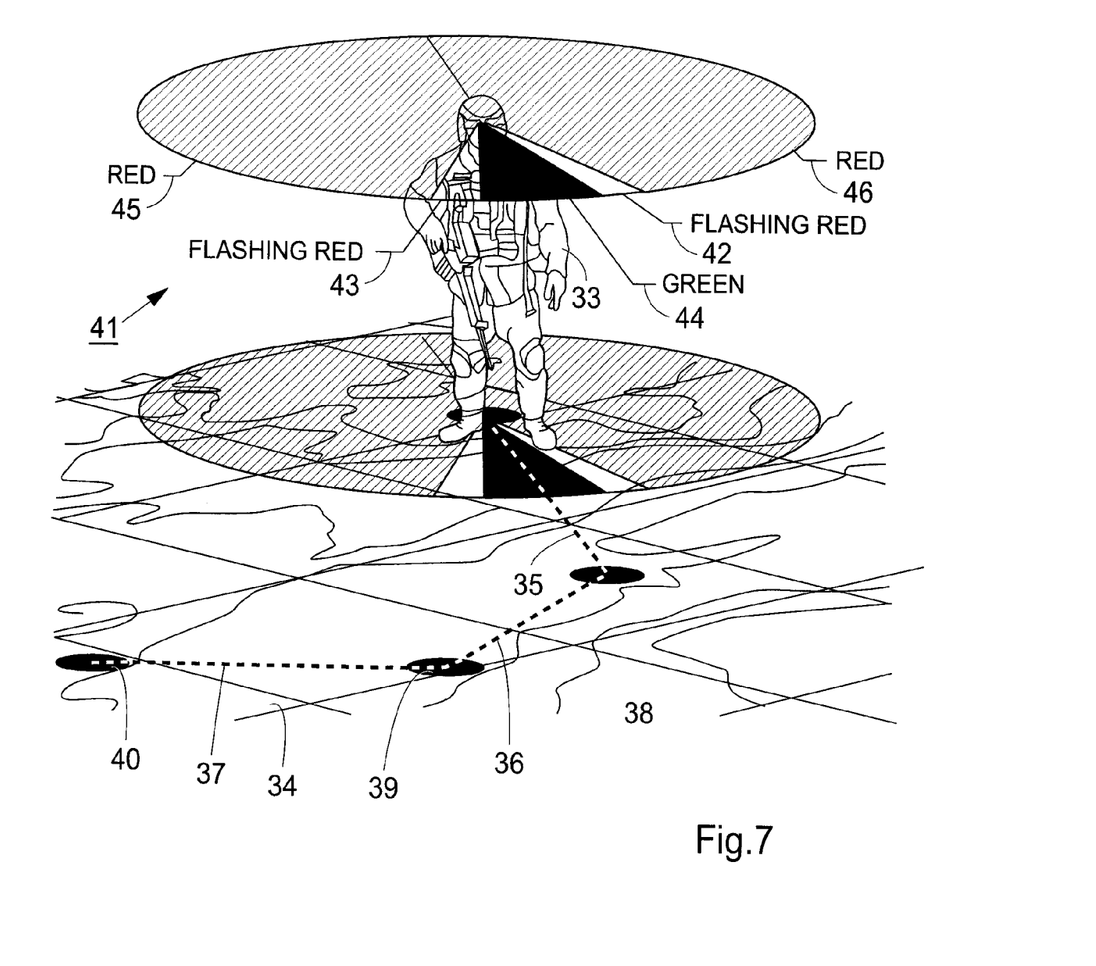
FIG. 7 depicts schematically an example of how a soldier is presented with navigation information via a head-movement tracking display for guidance in the terrain.

Illustrated in FIG. 7 is an example of how a soldier 33 can be guided through the terrain 34. The proposed route is marked with broken lines 35, 36 and 37, and the locations for changes of direction are indicated by solid black circles 38, 39 and 40. A circle 41 with circle sectors 42-46 illustrates how the soldier 33 can be presented with information in his head-worn display. In the case in which he holds his head oriented essentially along the marked route 35, within sector 42, a green point of light shines at the centre of the display and the soldier must follow this direction in order to follow the proposed route. If the soldier turns his head further to the side relative to the marked route, this will be indicated by the activation of decentralized points of light, for example with a red light, at two levels, where a flashing red light, sector 43 or 44, can indicate that the deviation from the proposed route is not so great, whereas a constant red light, sector 45 or 46, indicates a greater deviation from the route.

Figure 8:
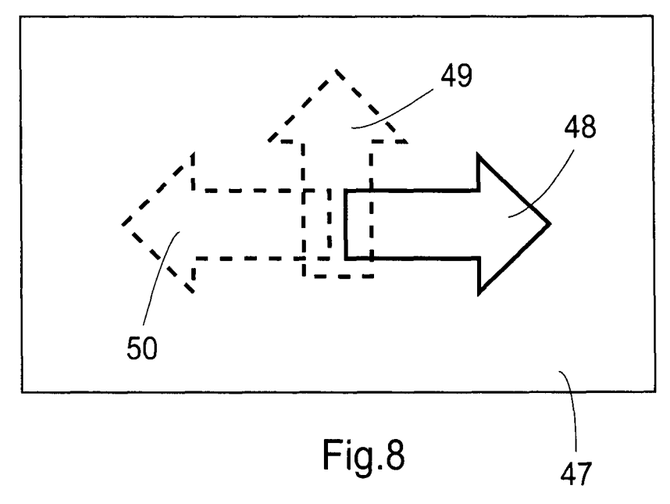
FIG. 8 depicts schematically an example of a display for the display of symbols in the form of arrows.

FIG. 8 illustrates an example of a display 47 which can be arranged as a "head-up" display in front of the wearer's 2 one eye 13. The display is normally transparent, where symbols in the form of arrows 48-50, for example, are generated to indicate the angle of the wearer's head relative to a target. Map images, text or similar can be included, if required, in addition to directional information in the form of arrows, where this is desirable. The arrows can be displayed one at a time in the same area.

The invention is not restricted to the embodiments described above by way of example, but it can be subjected to modifications within the scope of the following Patent Claims. For example, other colour combinations can be selected for the light-emitting diodes that are present. The number of light-emitting diodes present on a display can also be varied from three upwards. As far as the proposed angular intervals are concerned, these shall be regarded as examples that have been found to perform well in tests that have been carried out. However, this does not exclude other angular intervals or even the introduction of a different number of angular intervals.

In the detailed description above, the display of the presentation device is described as comprising light-emitting diodes forming points of light. Other types of sources of radiation can be used, of course, which are capable of producing suitable light signals in a cost-effective manner. Other conceivable sources of radiation can be based on fibre optics, lasers or incandescent light bulbs, for example.

The invention claimed is:

1. Method for presenting information about the angle to a target to a wearer by means of a display worn by the wearer tracking movement of the wearer's head, the wearer's head movements being detected and the angle of the wearer's head relative to a target being indicated on the display, wherein movements of the wearer's head are detected independently of the target, in that the wearer's position is determined locally, in that the position of the target is designated, and in that the display is controlled on the basis of local information about the wearer's head movement, the wearer's position and the position designated as the target in order to indicate the angle of the wearer's head relative to the target.

2. Method according to claim 1, wherein the angle of the wearer's head relative to a target is indicated by means of at least three separate points of light included on the display, arranged consecutively and capable of individual activation and control.

3. Method according to claim 2, wherein a central point of light is activated when the angle to the target coincides with or almost coincides with the angle of the wearer's head and lies within a first interval, in that an outer point of light located relative to the central point of light is activated when the angle of the wearer's head deviates to the left of the angle of the target and lies outside the first interval, and in that a corresponding outer point of light located relative to the central point of light is activated when the angle of the wearer's head deviates to the right of the angle of the target and lies outside the first interval.

4. Method according to claim 3, wherein an outer point of light located on the right relative to the central point of light is activated when the angle of the wearer's head deviates to the left of the angle of the target and lies outside the first interval and a corresponding outer point of light located on the left relative to the central point of light is activated when the angle of the wearer's head deviates to the right of the angle of the target and lies outside the first interval.

5. Method according to claim 2, wherein the angle of the wearer's head relative to the angle of the target is indicated by means of points of light in two dimensions incorporated into the display worn by the wearer for the purpose of designation in the lateral sense and in the vertical sense and in directions representing combinations of lateral directions and vertical directions.

6. Method according to claim 1, wherein the central point of light is activated to emit a constant, preferably green shining light and the outer points of light are activated with a constant shining light, preferably red, in the event of minor deviations outside the first interval and a flashing light, preferably red, in the event of major deviations outside the first interval.

7. Method according to claim 6, wherein the central point of light is activated within an interval of approximately ±5° for the deviation between the angle of the target and the angle of the wearer's head, a first outer point of light being activated with a constant shining light within an interval of approximately −15° to −5° and with a flashing light within an interval of approximately −180° to −15°, and a second outer point of light being activated with a constant shining light within an interval of approximately +5° to +15° and with a flashing light within an interval of approximately +15° to +180°.

8. Method according to claim 1, wherein the angle of the wearer's head relative to a target is indicated on the display by means of symbols that are capable of activation and control.

9. Method according to claim 8, wherein the symbols are positioned within the same area on the display.

10. Method according to claim 1, wherein the angle of the target relates to a specific target.

11. Method according to claim 1, wherein the angle of the target relates to a target in the form of an area such as a surveillance area or the boundary area of a firing range.

12. Method according to claim 1, wherein the angle of the target relates to a target in the form of a navigation route for the wearer.

13. Presentation device intended to present information about the angle to a target to a wearer comprising a display worn by the wearer and mounted in such a way as to track the wearer's head movements and a head tracker for detecting the wearer's head movements, which display indicates the angle of the wearer's head relative to the target and is controllable via a control unit, wherein the head tracker that it comprises is independent of the target, in that the presentation device comprises a local device for indicating the wearer's position, a receiver for receiving designation of the position of the target and a processing unit for controlling the display via the control unit in order to indicate the angle of the wearer's head relative to the target based on information gathered from the head tracker, from the device for indicating the position of the wearer and from a receiver for receiving designation of the position of the target.

14. Presentation device according to claim 13, the receiver for receiving designation of the position of the target is so arranged as to communicate with a target acquisition device capable of being aimed at the target.

15. Presentation device according to claim 14, wherein the target acquisition device consists of a laser rangefinder and an electronic compass.

16. Presentation device according to claim 13, wherein the display is arranged mounted on a helmet worn by the wearer.

17. Presentation device according to claim 13, wherein the head tracker is arranged adjacent to the wearer's head, preferably on a helmet worn by the wearer, in order to track movements of the wearer's head.

18. Presentation device according to claim 13, wherein the control unit includes a microprocessor.

19. Presentation device according to claim 13, wherein the aforementioned device for indicating the wearer's position consists of a GPS.

20. Presentation device according to claim 13, wherein the display comprises at least three separate individually activated points of light arranged consecutively in order to indicate the angle of the wearer's head relative to the target.

21. Presentation device according to claim 20, wherein the at least three points of light on the display are constituted by light-emitting diodes.

22. Presentation device according to claim 20, wherein the points of light are mounted consecutively essentially in the horizontal sense.

23. Presentation device according to claim 20, wherein, in the case of three points of light arranged consecutively, the middle point of light is so arranged as to shine with a different colour, preferably green, from the colour, preferably red, with which the outer points of light are arranged to shine.

24. Presentation device according to claim 20, wherein the control unit regulates the brightness of the points of light by pulse width modulation, PWM.

25. Presentation device according to claim 20, wherein the display comprises points of light in two perpendicular directions, whereby at least three points of light are included in each direction.

26. Presentation device according to claim 20, wherein the number of points of light arranged consecutively on the display are uneven in number.

27. Presentation device according to claim 13, wherein the processing unit and the control unit based on gathered information are so arranged as to indicate the angle of the wearer's head relative to a target on the display by means of symbols such as arrows.

* * * * *